United States Patent
Gustafsson

[15] 3,703,322
[45] Nov. 21, 1971

[54] HYDROSTATIC BEARING

[72] Inventor: Anders Christer Gustafsson, Nymanegatan, Sweden

[73] Assignee: SKF Industrial Trading and Development Company, NV Amsterdam, Netherlands

[22] Filed: Sept. 22, 1971

[21] Appl. No.: 182,804

[30] Foreign Application Priority Data

Sept. 23, 1970 Sweden .................12909/70

[52] U.S. Cl. ...............................308/122
[51] Int. Cl. ...............................F16c 17/02
[58] Field of Search.....................308/9, 122 A

[56] References Cited

UNITED STATES PATENTS 3,351,394   11/1967   Hooker.....................308/122

Primary Examiner—Edgar W. Geoghegan
Assistant Examiner—Frank Susko
Attorney—Dexter N. Shaw et al.

[57] ABSTRACT

The bearing block of a hydrostatic bearing carrying a cylindrical shaft member is, beside the main, centrally located hydrostatic pocket provided with at least two auxiliary pockets located opposite to each other, outside the main pocket. Each of these auxiliary pockets is by way a passage provided with throttling means connected to the source of fluid supply, and an adjustment of the pressure within the auxiliary pockets is automatically obtained if the bearing is subjected to an obliquely directed load.

3 Claims, 4 Drawing Figures

PATENTED NOV 21 1972
3,703,322
SHEET 1 OF 2

PATENTED NOV 21 1972 3,703,322

HYDROSTATIC BEARING

BACKGROUND OF THE INVENTION

A hydrostatic bearing may be composed of a number of mutually independent bearing blocks, which each is provided with at least one pocket connected to a pressure fluid supply source. Due to their limited capacity for self-adjustment, such bearings have hitherto mostly been used with plane or part-spherical surfaces.

When a shaft member is to be carried in a hydrostatic bearing, it is desirable to provide a possibility for self adjustment at the bearing block or blocks, so the bearing surface of the block will cooperate with the bearing surface of the shaft in the best possible manner. A possible deflection of or an obliquely directed load upon the shaft will impose a tilting moment upon the block, and a hydrostatic pocket located centrally in the block will then be unable to maintain its carrying capacity, which may lead to damages upon the block, and/or upon the shaft member.

SUMMARY OF THE INVENTION

According to the present invention, the service capacity of the bearing is increased thereby that the, or each block, is carried by a base support in such a manner that its position is relative thereto may be changed as a result of a possible deflection of the shaft member, and in which each block beside the central pocket is provided with at least two auxiliary pockets located opposite to each other outside the central pocket, each of said auxiliary pockets by way of a passage including throttling means being connected to the central pocket. A development of the bearing surface of each block preferably is of basically square form, and the central pocket is circular, one auxiliary pocket, preferably of substantially triangular form, being located at each corner portion of the square surface outside the central pocket.

DESCRIPTION OF A PREFERRED EMBODIMENT

Figure 1:
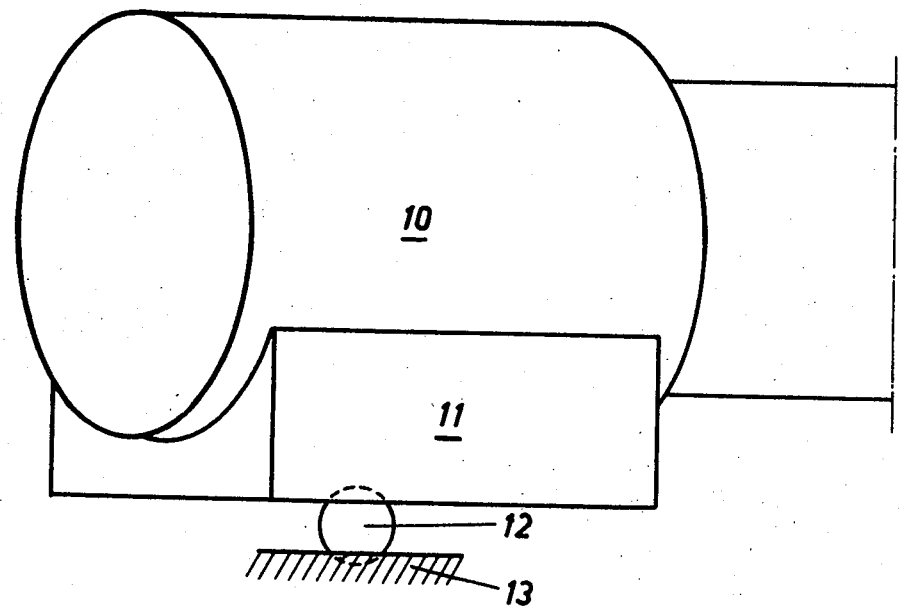
FIG. 1 very schematically shows a shaft member carried by a single hydrostatic bearing block.

In FIG. 1 a cylindrical shaft member 10 is carried in a hydrostatic bearing, which comprises a single bearing block 11 having a part-cylindrical carrying surface, and which by means of a cylinder or a ball 12 is pivotally mounted on a base support 13. This bearing block is provided with a hydrostatic pocket, which is supplied with pressure fluid by way of a conduit (not shown) in such a manner that the shaft member mainly will be carried hydrostatically.

Figure 2:
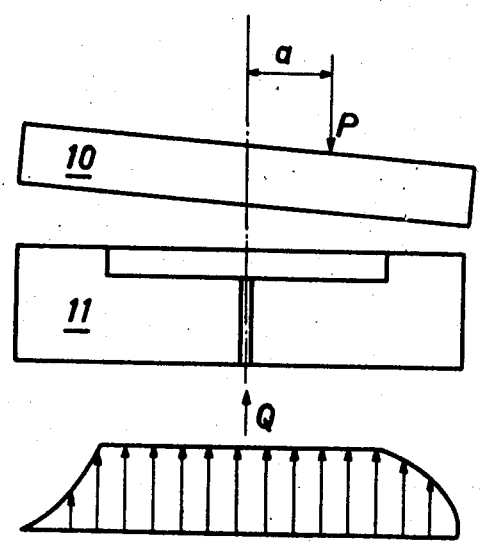
FIG. 2 shows the build-up of pressures within this bearing when the shaft member is subjected to an obliquely directed load.

The buildup of pressure within a bearing where the bearing surfaces are displaced in relation to each other due, for instance to an obliquely directed load, is schematically shown in FIG. 2. The hydrostatic pocket may carry a certain amount of obliquely directed load, i.e. a tilting moment $P \times a$, caused by the uneven pressure distribution upon the block, but the moment imposed by the frictional forces during a relative movement of the bearing surfaces usually is much higher than the maximum torque, which the block is able to take care of. It is evident that the clearance between the shaft member and the block, when the maximum torque is exceeded, will decrease at one side of the block and increase at the opposite side thereof, which results in a non-uniform spill of fluid from the pocket.

Figure 3:
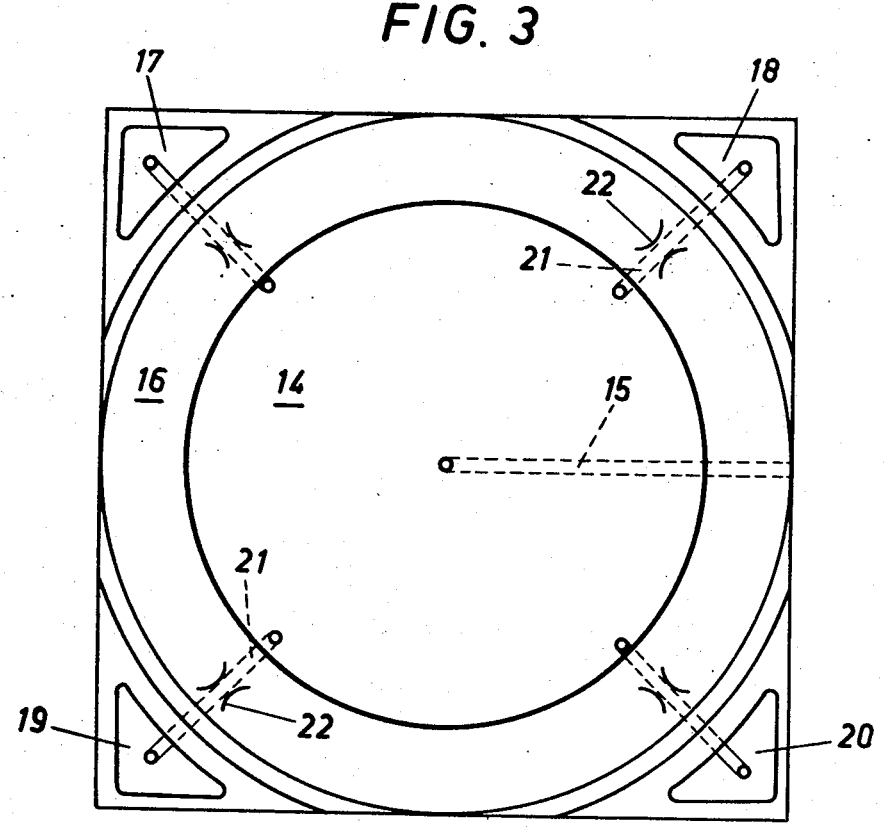
FIG. 3 shows a bearing block, as viewed from above.
Figure 4:
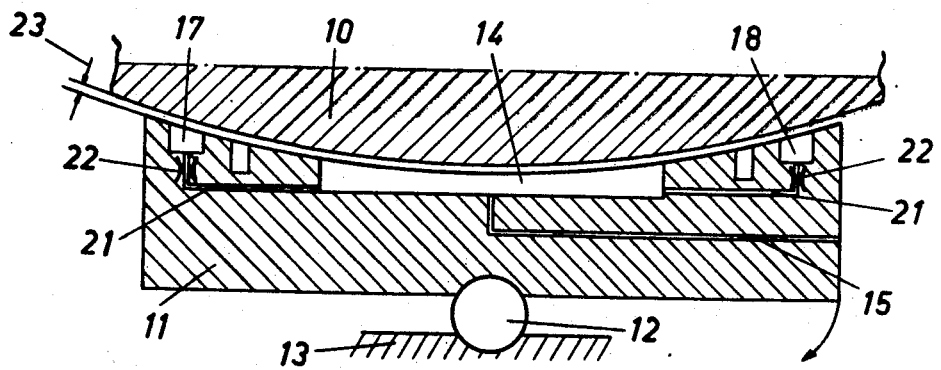
FIG. 4 shows a longitudinal section through the same.

An improved design of the bearing block is shown in FIGS. 3 and 4. A development of the bearing surface of the block has a substantially square form, and in the carrying surface thereof a centrally located pocket 14 is arranged. This pocket is supplied with a pressure fluid from a suitable source by way of a conduit 15 passing through the block.

An auxiliary pocket 17, 18, 19 and 20, respectively, having a basically triangular form is located at each corner of the block, outside the annular border portion 16 enclosing the circular, central pocket. Each of these auxiliary pockets is connected to the central pocket by way of a short passage 21 including throttling means 22.

The bearing block is carried by the support base 13 by means of a ball 12 in such a manner that its position with respect to the base will be automatically adjusted following a deflection of the shaft member. During normal running there is a clearance 23 between the shaft member 10 and the bearing block 11, said clearance determining the amount of fluid being spilled from the pocket. The central pocket as well as the auxiliary pockets will contribute to the carrying of the shaft member.

If this clearance, due to a deflection of or an obliquely directed load upon the shaft, should be altered so that it becomes less at one side of the block than at the opposite side thereof the spill of fluid will be influenced. FIG. 4 shows auxiliary pockets 17 and 18. If the bearing shown in FIG. 4 is subjected to a moment which tends to rotate it clockwise, as indicated by the arrow, the thickness of the film of fluid above pocket 18 will increase, while it simultaneously decreases above pocket 17. Due to the throttling in the passage 21 leading to pocket 18, the supply of fluid thereto will not increase with an amount corresponding to the larger spill through the temporarily increased clearance. The pressure within pocket 18 will then be lowered. At pocket 17, on the other hand, the clearance will be decreased and the pressure therein will accordingly be increased. Due to this changed distribution of the pressure the bearing is capable to take care of higher oblique loads than a bearing of conventional type, where each block has a central pocket only. On such occasions where deflections or obliquely directed loads are exerted in a single plane only, it will be sufficient to have one elongated pocket to each side of the central pocket. FIG. 1 shows a single bearing block supporting the shaft member, but it is evident that, with increased diameter of the shaft member and/or the load imposed thereon, a number of cooperating bearing blocks may be arranged in conjunction to the shaft member.

WHAT I CLAIM IS:

1. A hydrostatic bearing designed to cooperate with a cylindrical surface of a shaft member and including at least one bearing block provided with a centrally located pocket connected to a source of pressure fluid supply in which the, or each block, is carried by a base support in such a manner that its position in relation thereto may be changed in at least one plane as a result of a possible deflection of the shaft member, and in which each block, beside the central pocket is provided with at least two auxiliary pockets located opposite to each other, outside the central pocket, each of said auxiliary pockets by way of a passage including throttling means being connected to the central pocket.

2. The hydrostatic bearing according to claim 1, in which a development of the bearing surface is of basically square form and the central pocket is circular, one auxiliary pocket being located at each corner portion of the square surface outside the central pocket.

3. The hydrostatic bearing according to claim 2 in which each auxiliary pocket is of basically triangular form being defined by two sides arranged perpendicular to each other and a third side mainly following the contour of the adjacent portion of the central pocket.

* * * * *

UNITED STATES PATENT OFFICE
CERTIFICATE OF CORRECTION

Patent No. 3,703,322          Dated November 21, 1971

Inventor(s)    Anders Christer Gustafsson

It is certified that error appears in the above-identified patent and that said Letters Patent are hereby corrected as shown below:

The issue date on this patent should be

-- November 21, 1972 --

Signed and sealed this 12th day of November 1974.

(SEAL)
Attest:

McCOY M. GIBSON JR.          C. MARSHALL DANN
Attesting Officer            Commissioner of Patents